Sept. 5, 1967 T. A. SCHREYER 3,339,353
GANG MOWER
Filed Jan. 23, 1964 3 Sheets-Sheet 1
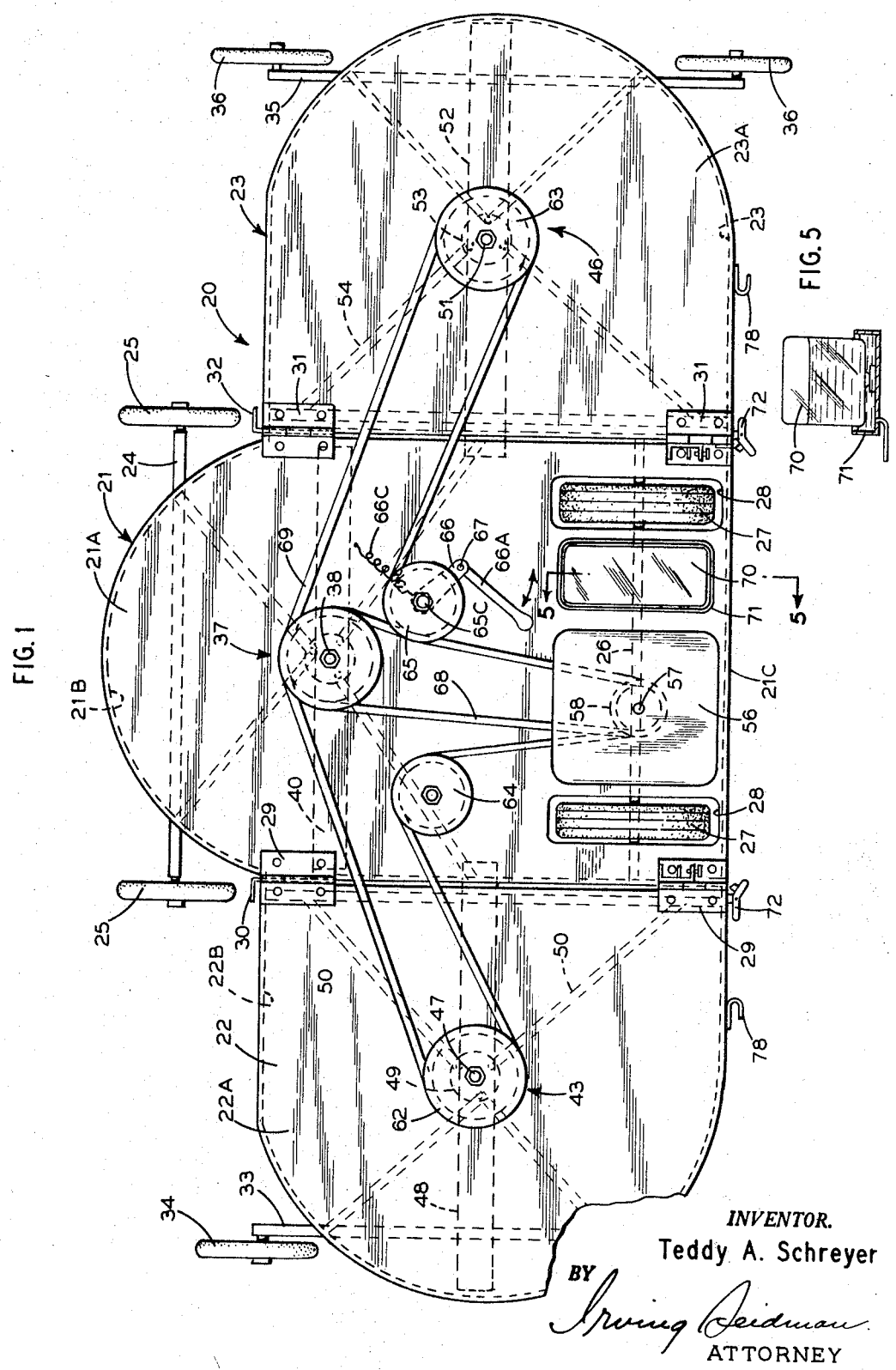
INVENTOR.
Teddy A. Schreyer
BY
Irving Seidman
ATTORNEY

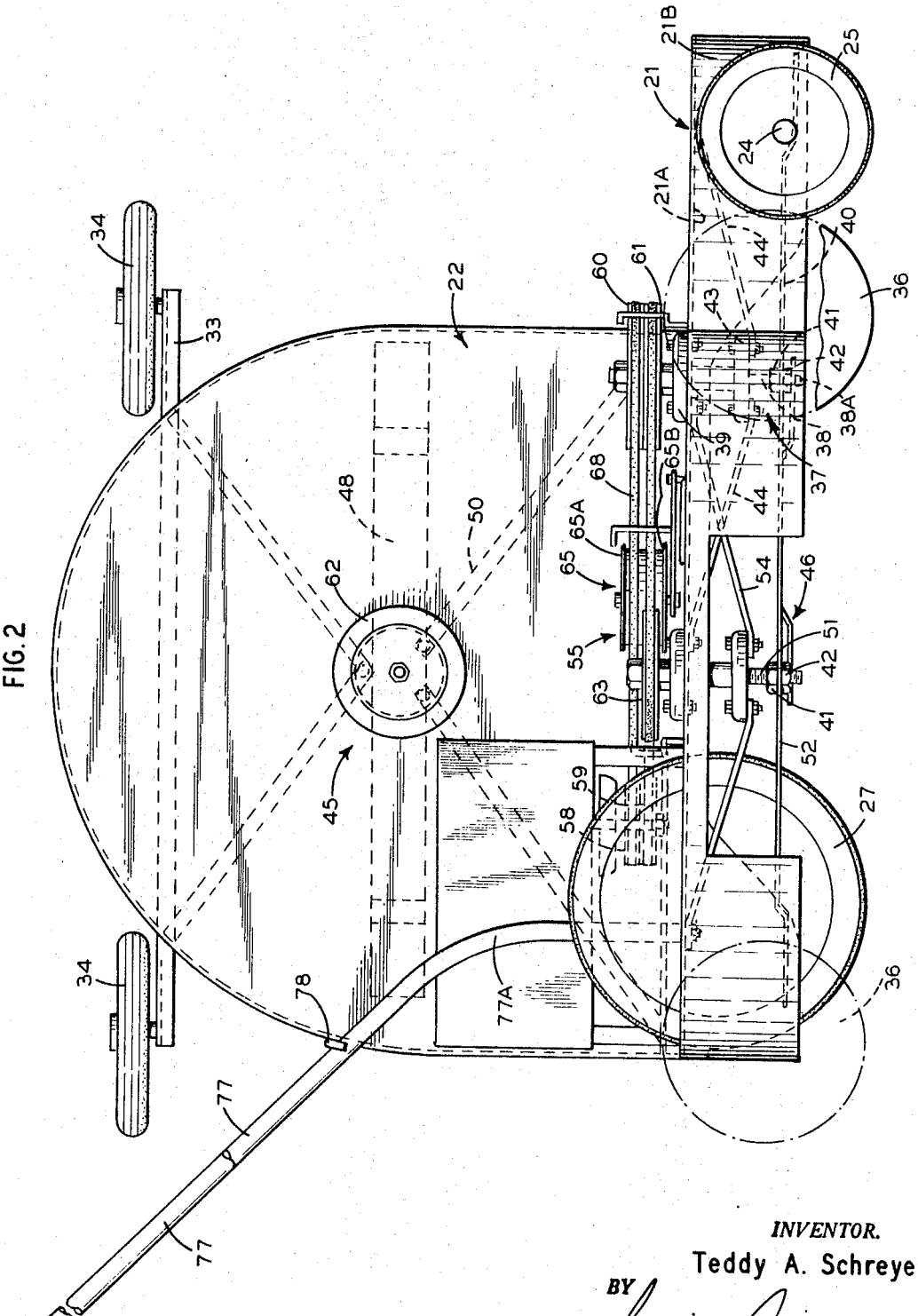

Sept. 5, 1967        T. A. SCHREYER        3,339,353
GANG MOWER
Filed Jan. 23, 1964        3 Sheets-Sheet 3
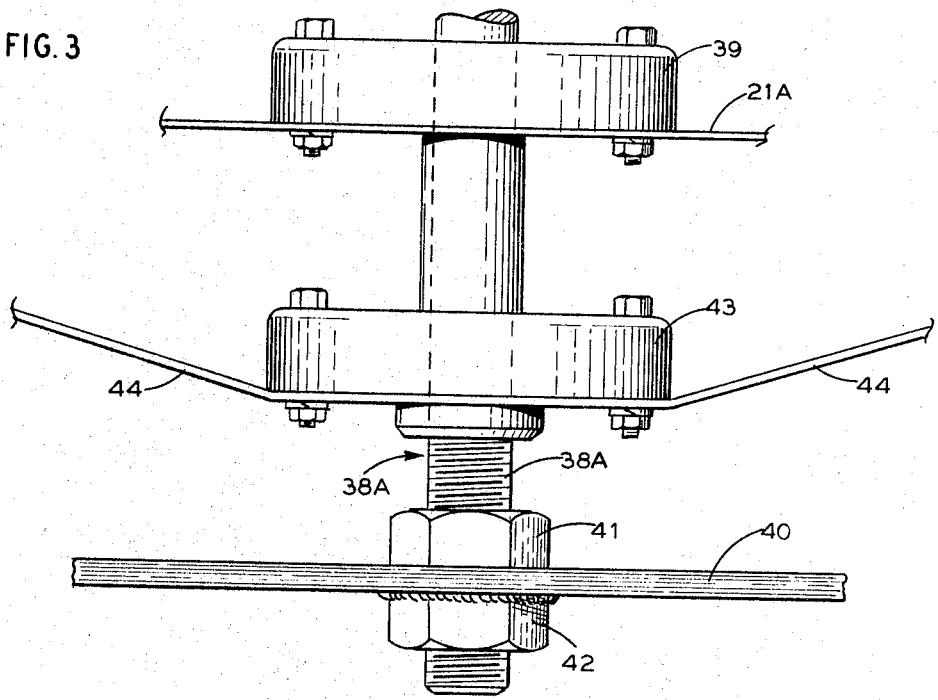
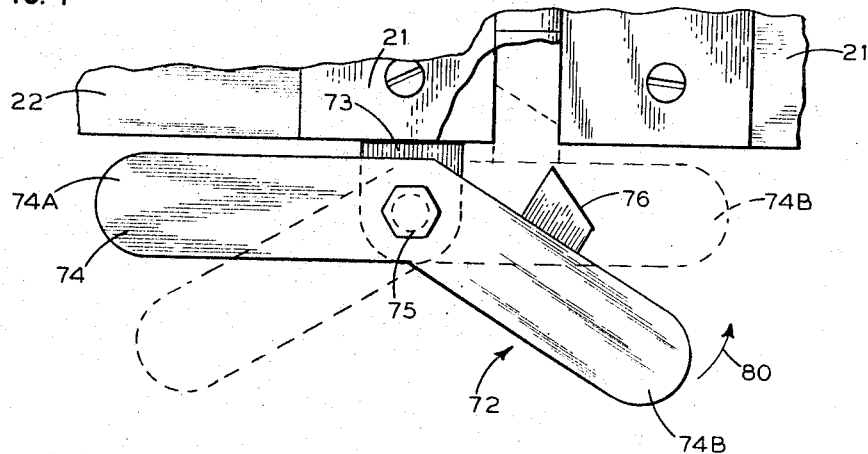
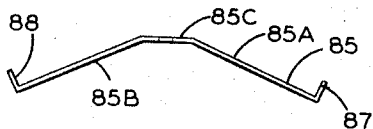
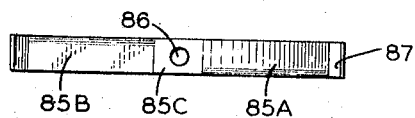
INVENTOR.
Teddy A. Schreyer
BY
Irving Seidman
ATTORNEY United States Patent Office 3,339,353
Patented Sept. 5, 1967

3,339,353
GANG MOWER
Teddy A. Schreyer, Bayside, N.Y., assignor to Bonamarte, Inc., a corporation of New York
Filed Jan. 23, 1964, Ser. No. 339,659
11 Claims. (Cl. 56—6)

This invention relates in general to a power mower, and more specifically to a power driven, rotary, gang type mower which is particularly adapted for cutting grass lawns and the like.

Heretofore, the known mower constructions, and more particularly, the gang type mower constructions were relatively complex in structure, cumbersome, heavy, difficult to handle, and relatively expensive to manufacture. Another disadvantage noted of the known rotary mowers is that they are unable to satisfactorily disperse the grass clippings or cuttings in a uniform manner over the area mowed. That is, the known mower constructions deposited the grass cuttings and clippings in unsightly lumps or piles scattered over the area of the lawn. For this reason, it has been heretofore necessary to follow up a grass cutting operation with a raking operation to collect or clear the residue piles or lumps of grass cuttings scattered over the lawn area so as to give the lawn the desired neat, freshly cut, and pleasing appearance. This collection or raking operation greatly added to the time, effort and labor required to cut a lawn. In the case of wet or moistened grass, this condition is even more aggravated.

Another disadvantage which has been noted in the gas driven mowers, and mowers in general, is that the gas tank supplying the fuel to the gas engine has been always fixedly secured on the frame or housing of the mower adjacent to the gas engine. Since such gas tanks have a relatively small capacity, it is necessary that the gas tank be frequently filled. Heretofore, the operator more often than not, generally refilled the tank by pouring gas directly thereinto from a reserve supply can as the mower is standing on the lawn at the precise spot where the tank has run dry. For this reason unless extreme care is exercised, some of the gas would unavoidably spill or drip onto the lawn. When this occurred, the grass wetted by the fuel gas eventually would die and turn brown. Consequently, if this happens with any regularity, the lawn would be spotted with brown dead areas.

The known lawn mowers also utilized relatively complex mechanisms to render the mower adjustable to vary the cutting height of the blades. For this reason, the adjustment once set, remained set. Consequently, the lawn was not always cut at its optimum cutting height.

Therefore, an object of this invention is to overcome the foregoing mentioned disadvantages by providing a mower construction that is relatively simple in construction, can be easily handled, and is inexpensive to manufacture or fabricate, and which is positive in operation.

It is another object of this invention to provide an improved mower construction that is constructed and arranged to uniformly disperse the grass clippings or cuttings over the area of the lawn so as to minimize or completely eliminate the need of raking or of collecting the grass clippings.

Still another object of this invention is to provide a mower in which the adjustment of its cutting blade can be effected in a simple and expedient manner.

Still another object of this invention is to provide a mower construction in which the gas tank can be filled without effecting any spillage or overflow of fuel gas onto the lawn.

Still another object of this invention is to provide a gang mower which is relatively simple in construction and in which the ganged units thereof can be operated either all together or in part.

In accordance with this invention, the above objects, and other features and advantages are attained by a gang mower comprising essentially of a main unit or cutter housing, and a pair of connected supplemental outboard units or cutter housings. In accordance with this invention, the respective outboard units or cutter housings are disposed on either side of the main unit or housing and are connected thereto for movement between a substantially horizontal operative position and a substantially vertical inoperative position. The respective outboard units are hingedly connected to the main unit in a manner to render the same readily assembled and disassembled from the main unit. Each of the respective units are provided with wheel means by which the same may be wheeled over the ground. Each of the respective units is also provided with its own independent cutting means comprising essentially of a spindle rotatably journalled to the respective housings thereof and a cutting blade adjustably secured to the respective spindle. The arrangement is such that the peripheral edge or tip portions of the outboard units overlap the tip ends of the cutting blade of the main unit so that in operation, a clear, wide cutting path is provided.

In accordance with this invention, bracing means are provided on each of the respective housing units which co-act with the respective blades to disperse the grass clippings or cuttings. The arrangement is such that the clippings or grass cuttings are uniformly dispersed over the area being cut to eliminate any lumping or piling of the grass clippings at scattered intervals over the lawn.

The gang mower is constructed and arranged so that the respective outboard units are freely movable with respect to the main unit so that the same are free to follow the contour of the land over which the mower is being moved. Means are provided to firmly lock either of the respective outboard mower units relative to the main unit in the event it is desired to maintain either outboard unit fixed relative to the main housing as when in trimming or edging about flower beds or the like.

A drive means is also provided whereby the respective outboard units and the main unit disposed therebetween may be driven from a single power source. In accordance with this invention, the power source comprises a prime mover, as for example, a gas engine or the like which is connected in driving relationship with the cutting means of the main unit and with each of the respective cutting means of the outboard units through a flexible drive connection. The arrangement is such that the motor means is connected to the cutting means of the main unit through one flexible drive connection and to the respective cutting means of the outboard units by means of another distinct flexible drive means. A clutch means is provided for simultaneously engaging and disengaging each of the respective flexible drive means into driving relationship.

The instant invention further contempltaes the use of a readily removable gas tank which can be bodily removed from the mower so that it can be physically removed and carried off the lawn when it is required to be filled. In this manner any spillage of gas directly on the lawn is prohibited.

If desired, the mower can be readily converted into a leaf mulcher by the interchanging of cutting blades.

Therefore, a feature of this invention resides in the provision of a gang mower in which the respective outboard units thereof can be readily assembled and disassembled with respect to the main unit thereof.

Another feature of this invention resides in the provision of bracing means which function as a means to uniformly disperse the grass cuttings or clippings in a manner to minimize any lumping or piling thereof over the area of the lawn.

Still another feature of this invention resides in the provision of a readily removable gas tank to facilitate the filling of the same at a point remote from the lawn area so as to prohibit any spillage of gas onto the lawn area during a filling operation.

Still another feature of this invention resides in the provision of the novel locking means for firmly locking either of the respective outboard units of the mower relative to the main unit thereof.

Still another feature of this invention resides in the provision of the relatively simple and expedient manner in which the cutting height of the respective cutting blades can be adjusted.

Still another feature of this invention resides in the provision of a novel drive connection and clutching arrangement therefor which permits either the simultaneous driving of all of the respective cutter units and the slippage necessary in the event the cutting blades hit a solid object.

Still another feature of this invention resides in the provision whereby the individual cutting blades may be readily removed or replaced.

Still another feature resides in the provision of a novel blade construction which can be fitted to the mower for converting the same to a leaf mulcher.

Other features and advantages will become more readily apparent when considered in view of the drawings and specification in which, FIGURE 1 is a plan view of the gang mower of the instant invention.

FIGURE 2 is a right end view of the mower of FIG. 1 illustrated with one of its outboard units disposed horizontal in operative position with respect to its main unit and having its other outboard unit disposed in its vertically stowed inoperative position.

FIGURE 3 is an enlarged detail elevation view of the cutter blade arrangement.

FIGURE 4 is a fragmentary detail plan view of the locking means for securing an outboard unit fixed with respect to its main unit, the solid line showing illustrates the locking device in its inoperative position, and the dotted line position thereof illustrating the locking positions thereof.

FIGURE 5 is a detail view of the removable gas tank construction.

FIGURE 6 is a detail side view of a leaf mulching cutting blade.

FIGURE 7 is a plan view of FIG. 6.

Referring to the drawings, there is shown in FIGS. 1 and 2, the gang mower 20 of the instant invention. It comprises essentially of a main unit or housing 21 and a pair of readily detachable outboard units 22 and 23. As shown, the main housing or unit 21 comprises as shell which has a top portion 21A and a depending sidewall portion 21B circumscribing the peripheral edge portion thereof. As shown, the main unit is provided with an arcuate or curved leading edge portion, a pair of substantially parallel sidewall portions and a straight rear wall portion 21C. Wheel means are provided for maintaining the main portion in rolling engagement with the ground. As shown, the wheel means comprises a front axle 24 and a rear axle 26 connected to the side walls of the main housing or unit 21. Journalled on the ends of the respective axles 24, 26 are the wheels 25, 27 respectively of the main unit. As shown, the rear wheels 27 are made somewhat larger in diameter than the front wheels 25. In order to accommodate the rear wheels 27, appropriate openings or cut outs 28 are provided in the top wall 21A of the main housing unit.

Each of the respective outboard units 22, 23 comprise shells having a top wall portion 22A, 23A and a dependently connected side walls 22B, 23B circumscribing the peripheral edge portions of the respective top walls. Accordingly, each of the respective outboard units 22, 23 are hingedly connected to the opposed side portions of the main unit 21 so as to be freely movable relative thereto. As shown, hinges 29 pivotally connect the left outboard unit 22 to the left side of the main unit 21, and hinges 31 secure the right outboard unit 23 to the right side of the main unit 21 so that the adjacent or contiguous side walls of the respective housings are slightly spaced apart. As shown, each of the outboard units 22, 23 is provided with an axle 33 and 35 respectively. The respective axles 33 and 35 are disposed parallel with respect to one another and normal to the axles 24, 26 of the main housing. Journalled to either end of the respective axles 33 and 35 are wheels 34 and 36 respectively.

In order to render the respective outboard housings 22, 23 readily detachable with respect to the main housing unit 21, readily removable hinge pins 30, 32 are provided to secure the leaves of the respective hinges 29, 31 in operative position. To facilitate removal of the respective hinge pins 30 and 32, the ends of the pins are angularly disposed.

Each of the respective housing units 21, 22 and 23 is provided with a cutting means. For example, the cutting means 37 of the main housing unit comprises a spindle 38 which extends through the top portion 21A thereof. As shown, the spindle is rotatably journalled in a bearing means 39 which is secured to the top wall 21A of the housing. The lower end of the spindle 38 is provided with a threaded portion 38A to which an adjusting nut 41 is threaded. Fitted to the threaded end 38A of the spindle 38 is the cutting blade 40. As shown, the cutting blade 40 of the main housing is sized so that the tips thereof are disposed adjacent the side walls of the main housing. A lock nut 42 is threaded to the end 38A of the spindle 38 to firmly lock the blade 40 in position thereon. From the foregoing description of the cutter assembly, it will be readily apparent that to adjust the cutting height of the cutting blade 40, all that is required is to adjust the elevation of the adjusting nut 41 by rotating the same either clockwise or counterclockwise about the spindle to set the desired elevation. Accordingly, the adjustable nut 41 defines a stop or limit against which the cutting blade 40 is placed. The lock nut 42 is then threaded to fix the blade 40 therebetween. In this manner, it will be noted that the adjustment of the cutting blade 40 can be effected without recourse to varying the position of the wheels.

Disposed about the spindle 38 between the adjusting nut 41 and the top 21A of the main shell 21 is a bearing collar 42. To maintain the bearing collar in vertical alignment with the spindle, a plurality of bracing bars 44 are provided. As shown the ends of the respective bracing bars 44 are secured at one end to the bearing collar 43 and at their respective other ends to the top wall 21A of the housing. The arrangement of the bracing bars 44 is such that the respective bars extend radially of the bearing collar 43 and extend to a peripheral or marginal portion of the main housing. In the illustrated embodiment, the four bracing members are illustrated as being substantially equidistantly spaced about the axis of the spindle 38.

The cutting means 45, 46 of the respective outboard units 22, 23 are similarly constructed. For example, the left outboard unit 22 is provided with a cutting spindle 47 which extends through the top wall 22A of its housing. Connected to its lower end is an adjusting nut, the cutting blade and its lock nut, similar to that described with respect to the cutter means 37 of the main housing.

A bearing collar 49 is provided for maintaining the alignment of the spindle 47 of the outboard unit 22, and bracing bars 50 are provided for insuring this relationship.

The right outboard unit is also provided with a spindle 51 to which the cutting blade 52 is adjustably connected as hereinbefore described. As best seen in FIG. 1, it will be noted that the respective cutting blades 40, 48, 52 are disposed so that the peripheral or tip portions thereof overlap to insure a uniform wide cut during operation of the gang mower. In order to effect this overlap, the adjacent side wall portions of the main unit and each of the respective outboard units disposed to either side thereof are provided with cutout portions to provide clearance for the cutting blades 48, 52 of the respective outboard units 22, 23. While the illustrated embodiment depicts the respective outboard cutting blades as being sufficiently long to overlie the peripheral tip ends of the center unit cutting blade 40, it will be readily understood that the center blade 40 can be made to extend over the tip ends of the respective outboard cutters.

In accordance with this invention, a power means is provided for simultaneously effecting the operation of each of the respective cutter means. In the illustrated form of the invention, a single power means, e.g. a gas engine or motor 56 is utilized as the prime mover. As shown, the gas engine 56 comprises a drive shaft or spindle 57 which has connected to the free end thereof a pair of pulleys 58, 59. The extended end of the spindle 38 of the main cutter assembly also has fixed thereon a pair of complementary pulleys 60 and 61. The extended end of each of the respective spindles 47, 51 of the outboard units 22, 23 are provided with a single pulley 62 and 63 respectively. Rotatably journalled to the top wall 21A of the main housing 21 is an idler pulley 64.

In accordance with this invention, a flexible drive means is employed to connect the motor means 56 in driving relationship to the respective cutter means. In the illustrated embodiment, the motor means 56 is connected in driving relationship to the respective cutting means 37 of the main unit 21 and to each of the outboard units by flexible drive belts 68 and 69 respectively. As best shown in FIG. 2, the flexible drive belt 68 is threaded about pulleys 58 and 60 for connecting the main cutting means 37 into driving relationship with the motor 46. Flexible belt 69 is threaded about pulleys 59 and 61 and about the respective pulleys 62, 63 of the outboard cutter means 45, 46. Also, the intermediate portion of the belt is threaded about a fixed idler pulley 64 which serves to tension the same.

In accordance with this invention, a clutch means is provided for simultaneously engaging and disengaging each of the respective belt drives 68 and 69 into and out of driving relationship with the motor 46. As shown, the clutch means comprises a movable idler 65 which comprises a pair of pulleys 65A, 65B which is pivotally mounted about a pivot 67. As shown, the double pulleys 65A, 65B are rotatably journalled about a pivot 65C connected to one end of a lever 66 which is pivoted at its other end at 67. Connected to the pivoted end of lever 66 to a handle means 66A for swinging the pulley clutch about an arc to vary the tension on the respective driving belts of 68 and 69. Thus as shown in FIG. 1, by pivoting the handle 66A and connected lever 66 in a clockwise direction about pivot 67, the tension or slack on the respective drive belts 68, 69 is increased thereby causing the respective belt to drive the associated pulleys and thereby render the cutters operative. As the tension on the belt is decreased by swinging the handle 66A counterclockwise about its pivot 67, the clutch idler 65 disengages the drive belts 68 and 69 from the respective pulleys thereof as actuated. A spring means 66C is provided for normally maintaining the double clutch pulley arrangement 65 in driving engagement with the respective flexible belts 68 and 69.

In accordance with this invention, the fuel for the engine is supplied from a gas tank 70 which is removably connected to a gas receptacle 71, the latter being fixed to the top plate 21A of the main housing. Preferably the gas tank 70 is made of a translucent or transparent material so that the level of the fuel gas can be observed at all times. By rendering the fuel tank 70 readily removable from the mower, the spillage of gas on the lawn is eliminated in that the operator may remove the gas tank 70 and carry the same off the lawn where the same may be filled. Consequently all danger of gas spilling onto the lawn is eliminated. When the gas tank has been so filled, it can then be carried over to the mower and repositioned in its receptacle so that gas flow will again be directed to the engine.

As the respective outboard units 22 and 23 are hingedly connected to the central unit 21, they are rendered freely movable relative thereto. For this reason, the respective outboard units are free to follow the contour of the ground over which the mower is being moved. Thus with the respective cutter blades 40, 48 and 52 set, a uniform grass height cutting can be maintained regardless of the slope or contour of the ground.

Whenever it is desired to mow about flower beds or the like, means are provided for firmly securing the respective outboard units in fixed relationship with respect to the main unit and thereby lock outboard unit so that it is held clear of the flower bed, usually disposed at a somewhat lower elevation than the adjacent portions of the lawn. The novel locking means 72 comprises a locking lever 74 which is pivotally mounted to a lug 73 about a pivot pin 75. Accordingly, the locking lever 74 is defined by angularly disposed arm portions 74A, 74B. A locking wedge 76 is connected to one arm 74B of the locking lever. The arrangement is such that when the arm 74B of locking lever 74 is kicked counterclockwise as indicated by arrow 80 into operative position, the cam 76 is wedged between the adjacent side walls of the main housing 21 and its adjacent outboard housing. In this position as shown in the dash line of FIG. 4, the outboard unit is prohibited from pivoting relative to the main housing. Thus the locked outboard unit is maintained fixed in substantially horizontal position with respect to the main unit, and the cutting blade thereof is held clear of the marginal portions of a flower bed or the like. The lock is released by simply applying a force on the other end 74A of the lever 75 to rotate the same clockwise about its pivot 75.

A handle means 77 is provided to push the mower 20 over the lawn. As shown, the handle 77 comprises a tubular member which is provided at its lower end with a vertical upright portion 77A which gradually bends rearwardly and upwardly at an angle with respect thereto. The arrangement is such that the maximum mechanical advantage is attained when pushing the mower so that a minimum effort or force is required to move the same.

To maintain either or both of the respective outboard units 22, 23 in their vertically stowed position, a stowing lug 78 is secured to the rear wall of the respective outboard units. As shown in FIG. 2, the lug 78 is arranged so that in the respective vertical stowed position of the outboard units, the same may be latched onto the tubular handle, as shown in FIG. 2.

In operation, it will be noted that the gang mower described can be utilized either by operating the cutter of the main housing independently of the outboard cutters or by using the same simultaneously with both of the outboard cutters. The cutting is effected by the rapid rotation of the respective cutting blades when the motor is running and the clutch 65 is activated. Because of the bracing means 44, 50 and 54 of the respective units which serve to stabilize the spindles of the respective cutting means, the grass cuttings or clippings are prevented from compacting or lumping and are dispersed so that the same are uniformly spaced or deposited over the area which is being cut. Therefore, in operation, the braces 44, 50, and 54 function to break up any tendency of the grass clippings to lump together. Thus the rapid rotation of the individual cutters and the dispersement of the grass clippings by the respective bracing members 44, 50, 54 of the individual units effect uniform dispersal of grass cuttings or clippings not attained by known cutter constructions. For this reason, the amount of raking or collection required after a mowing operation is greatly minimized, if not totally eliminated. It has been noted that even after the grass has been considerably wetted or moistened, that it can still be cut with the instant mower without having the clippings lump or pile onto the lawn.

By a slight alteration of interchanging the cutting blade construction for a modified blade construction of FIGS. 6 and 7, the mower of the instant invention can be converted to a leaf mulcher. The modified blade construction of FIGS. 6 and 7 comprises a blade 85 bent so that the opposed arm 85A, 85B thereof are disposed with respect to one another to form therebetween an obtuse angle. At the central portion or apex 85C of the cutting blade there is provided with an opening 86 for receiving the spindle 38, for example, of the respective cutting means. The tips 87, 88 of the blade are bent upwardly, and as shown in FIG. 6 are disposed at substantially right angles with respect to the bent arm portions 85A, 85B thereof. Thus with the blades so constructed and described, effective leaf mulching is attained when the same are driven.

While the instant invention has been described and disclosed with reference to a particular embodiment thereof, it will be appreciated and understood that variations and modifications thereof may be made without departing from the spirit or scope of the instant invention.

What is claimed is:

1. A mowing device particularly adapted for cutting grass in a wide path and uniformly disbursing the cuttings over a wide area comprising:
   (a) main housing means and a pair of outboard housings hingedly connected thereto, each of said housings including a shell having a top and connected depending side wall portion extending about the periphery thereof,
   (b) wheel means for maintaining the respective housing in rolling relationship over the area to be mowed,
   (c) a cutting means including a spindle rotatably journalled on each of said housings, and a cutting blade connected to said spindle,
   (d) means for bracing the respective cutting means to its respective housing whereby said bracing means effects uniform disbursements of the cuttings over a wide area, and, a bearing collar connected to each of said spindles intermediate the respective ends thereof, and said bracing means including a plurality of bracing bars connected to each of said collars, said bars extending radially therefrom and spacially disposed between said cutting blades and the top of the respective shells,
   (e) a single power means, and a flexible drive means connecting said power means in driving relationship with said cutter means for driving each of said cutting means and means for selectively driving the cutter of the main housing independently or in conjunction with the drive of the respective outboard cutter means.

2. The invention as defined in claim 1 wherein: said means for selectively driving the cutting blades comprising a clutch means including an idler pulley mounted on said main housing for movement between operative and inoperative relationship with respect to said flexible drive means, and means for effecting movement of said idler pulley for tensioning or relaxing said flexible drive means accordingly.

3. A mowing device particularly adapted for cutting grass in a wide path and uniformly dispersing the cuttings over a wide area comprising:
   a main housing means and a pair of outboard housings hingedly connected thereto, each of said housings including a shell having a top and connected depending side wall portions extending about the periphery thereof,
   wheel means for maintaining the respective housings in rolling relationship over the area to be mowed,
   a cutting means rotatably journalled on each of said housings,
   means for bracing the respective cutting means to its respective housing whereby said bracing means effects uniform disbursements of the cutting means over a wide area, and
   a single power means for driving each of said cutting means, wherein
   said power means includes a gas engine,
   means for containing a supply of fuel for said engine,
   said fuel supply means including a receptacle fixedly mounted on said main housing, and
   a tank adapted to be removably supported in said receptacle for supplying fuel.

4. A mowing device particularly adapted for cutting grass in a wide path comprising:
   (a) main housing means including a shell having a top and connected depending side wall portion extending about the periphery thereof,
   (b) wheel means for maintaining said main housing means in rolling relationship over the area to be mowed,
   (c) an outboard housing means hingedly connected to either side of said main housing means whereby each of said outboard housings is rendered independently and freely movable relative to said main housing to follow the contour of the land over which the mower is moved,
   (d) a cutting means rotatably journalled on each of said housings,
   (e) a power means for driving each of said cutting means, and
   (f) a flexible drive means connecting said power means in driving relationship with each of said cutting means,
   (g) a clutch means for engaging and disengaging said motor in driving relationship with said cutting means, and
   (h) means for individually locking each of said auxiliary housings with respect to said main housing in the respective operative positions thereof so as to maintain said locked housing fixed relative to said main housing means.

5. The invention as defined in claim 4 wherein:
   (a) said locking means including an angled lever pivotally mounted on said main housing adjacent the spacing defined between the main housing and the outboard housing connected thereto,
   (b) said lever having a wedge extending outwardly therefrom,
   (c) said wedge being arranged to be cammed between said main housing and connected outboard housing to render said housings immobile with respect to one another when said lever is pivoted into its operative locking position.

6. A mowing device particularly adapted for cutting grass in a wide path and uniformly disbursing the cuttings over a wide area comprising:
   (a) main housing including a shell having a top and connected depending side wall portion extending about the periphery thereof,
   (b) wheel means for maintaining said main housing in rolling relationship over the area to be mowed,
   (c) an outboard housing hingedly connected to either side of said main housing so that each outboard housing is rendered freely movable relative to said main housing to follow the contour of the land,
   (d) a cutting means including a spindle rotatably journalled on each of said auxiliary housings,
   (e) a power means for driving each of said cutting means,
   (f) a flexible drive means connecting said power means into driving relationship to said spindle, (g) a clutch means for engaging and disengaging said motor in driving relationship with said cutting means, (h) means for individually locking either of said outboard housings with respect to said main housing so as to render the respective housing relatively immobile relative to each other, said locking means including an angled lever pivotally mounted on said main housing between said main housing and the respective hinged housing, said lever having a wedge extending outwardly therefrom and said wedge being arranged to be cammed between said main housing and the adjacent outboard housing to render said housings immobile with respect to one another when said lever is pivoted into operative locking relationship, and (i) means operatively associated with respective cutting means for effecting disbursing the cuttings over said wide path.

7. A ganged mowing device particularly adapted for cutting grass over a wide area comprising:

(a) a main housing and a pair of outboard housings, said outboard housings being disposed on either side of said main housing, (b) means for individually hinging the respective outboard housings to said main housing whereby either one or both of the respective outboard housings may be individually pivoted between operative and inoperative positions, (c) a cutting means rotatably mounted on each of said housings, (d) each of said cutting means including a rotatably journalled spindle and a cutting blade connected thereto, (e) means for driving each of said spindles, (f) said means including a motor means, (g) a first flexible drive means connecting said motor means in driving relationship with said cutting means of the main housing, (h) a second flexible drive means for connecting the motor in driving relationship to the cutting means of each of said auxiliary housings, (i) and a clutch means for simultaneously engaging and disengaging each of said flexible drive means, (j) and means cooperatively associated with each of said cutting means to effectively prevent lumping of the grass clippings, (k) said latter means including radially spaced bracing means for bracing the spindle of the respective cutting means, (l) said bracing means including radially disposed bars spaced from the top of the respective housing, (m) said bars functioning to uniformly disburse the clippings over a wide area.

8. A ganged mowing device particularly adapted for cutting grass over a wide path and for uniformly disbursing the cuttings thereof over a wide area comprising:

(a) main housing including a shell having a top and connected depending side wall portion extending about the periphery thereof, (b) wheel means for maintaining said main housing in rolling relationship over the area to be mowed, (c) an outboard housing hingedly connected to either side of said main housing whereby each outboard housing is rendered freely movable to follow the contour of the land independently of one another, (d) each of said outboard housings including a top wall and a connected depending side wall portion about the outer peripheral portions thereof, the adjacent side wall portions of said main housing and connected outboard housing having aligned cut-out portions, (e) a cutting means rotatably journalled onto each of said housings, (f) each of said cutting means including a rotatably journalled spindle extending through the top of the respective housings, (g) a cutting blade connected to the depending end of each spindle, (h) means for adjustably securing said blade to each of said spindles, (i) said adjusting means including a nut adjustably threaded to the end of said spindle to vary the cutting height of said adjustment, and a locking nut for securing the blade onto said spindle in the adjusted position thereof, the respective cutting blades having their respective tips ends orbiting in overlapping relationship, (j) means for bracing each of said spindles to its respective housing, (k) said bracing means including a bearing collar disposed about its respective spindle between the top of its housing and the associated adjusting nut, (l) and a plurality of radially extending tie bars, said tie bars each having one end thereof connected to said bearing collar and having its other end connected to a peripheral portion of said housing, (m) whereby said bracing means effect uniform disbursements of the cuttings over a wide area.

9. A gang mowing device particularly adapted for cutting grass over a wide path and for uniformly dispersing the cuttings thereof over a wide area comprising:

a main housing, including a shell having and connected depending side wall portion extending about the periphery thereof, wheel means for maintaining said main housing in rolling relationship over the area to be mowed, an outboard housing hingedly connected to either side of said main housing whereby each outboard housing is rendered freely movable to follow the contour of the land independently of one another, each of said outboard housings including a top wall and a connected depending side wall portion about the outer peripheral portions thereof, the adjacent side wall portions of said main housing and connected outboard housing having aligned cut-out portions, a cutting means rotatably journalled onto each of said housings, each of said cutting means including a rotatably journalled spindle extending through the top of the respective housings, a cutting blade connected to the depending end of each spindle, means for adjustably securing said blade to each of said spindles, said adjusting means including a nut adjustably threaded to the end of said spindle to vary the cutting height of said adjustment, and a locking nut for securing the blade onto said spindle in the adjusted position thereof, the respective cutting blades having their respective tip ends orbiting in overlapping relationship, means for bracing each of said spindles to its respective housing, said bracing means including a bearing collar disposed about its respective spindle between the top of its housing and the associated adjusting nut, and a plurality of radially extending tie bars, said tie bars each having one end thereof connected to said bearing collar and having its other end connected to a peripheral portion of said housing, whereby said bracing means effects uniform disbursements of the cuttings over a wide area, and including (a) means for containing a supply of fuel for said motor, (b) said fuel supply means including a fixed receptacle mounted on said main housing, (c) and a tank adapted to be removably supported in said receptacle for supplying a fuel thereto.

10. A gang mowing device particularly adapted for cutting grass over a wide path and for uniformly dispersing the cuttings thereof over a wide area comprising:
- a main housing, including a shell having and connected depending side wall portion extending about the periphery thereof,
- wheel means for maintaining said main housing in rolling relationship over the area to be moved,
- an outboard housing hingedly connected to either side of said main housing whereby each outboard housing is rendered freely movable to follow the contour of the land independently of one another,
- each of said outboard housings including a top wall and a connected depending side wall portion about the outer peripheral portions thereof, the adjacent side wall portions of said main housing and connected outboard housing having aligned cut-out portions,
- a cutting means rotatably journalled onto each of said housings, each of said cutting means including a rotatably journalled spindle extending through the top of the respective housings,
- a cutting blade connected to the depending end of each spindle,
- means for adjustably securing said blade to each of said spindles,
- said adjusting means including a nut adjustably threaded to the end of said spindle to vary the cutting height of said adjustment, and
- a locking nut for securing the blade onto said spindle in the adjusted position thereof, the respective cutting blades having their respective tip ends orbiting in overlapping relationship,
- means for bracing each of said spindles to its respective housing,
- said bracing means including a bearing collar disposed about its respective spindle between the top of its housing and the associated adjusting nut, and
- a plurality of radially extending tie bars, said tie bars each having one end thereof connected to said bearing collar and having its other end connected to a peripheral portion of said housing, whereby said bracing means effects uniform disbursements of the cuttings over a wide area, and including
  - (a) means for individually locking each of said outboard housings with respect to said main housing,
  - (b) said locking means including an angled lever pivotally mounted on said main housing adjacent the spacing defined between the adjacent hinged housings,
  - (c) said lever having a cam projection extending outwardly therefrom which is arranged to be wedged between said main housing and adjacent outboard housings to render said adjacent housing fixed relative to one another when said lever is pivoted into operative locking position.

11. A ganged mowing device particularly adapted for cutting grass over a wide path and uniformly disbursing the cuttings thereof over a wide area comprising:
  - (a) main housing means including a shell having a top and connected depending side wall portion extending about the periphery thereof,
  - (b) wheel means for maintaining said housing in rolling relationship over the area to be mowed,
  - (c) an outboard housing hingedly connected to either side of said main housing whereby each outboard housing is rendered freely movable to follow the contour of the land,
  - (d) each of said outboard housings including a top wall and connected depending wall portions extending about the respective outer peripheral portions thereof,
  - (e) a cutting means rotatably journalled onto each of said housings,
  - (f) each of said cutting means including a rotatably journalled spindle extending through the top of the respective housings,
  - (g) a cutting blade connected to the depending end of said spindle,
  - (h) means for adjustably securing said blade to said spindle to vary the cutting height thereof,
  - (i) said adjusting means including an adjustable nut threaded to the end of the spindle to set the limit of said adjustment, and a locking nut for securing the blade onto said spindle in the adjusted position thereof,
  - (j) means for bracing said spindle to said housing,
  - (k) said bracing means including a bearing collar disposed about said spindle between top of the associated housing and said adjusting nut, and
  - (l) a plurality of radially extending tie bars, said tie bars each having one end thereof connected to said bearing collar and having its other end connected to a peripheral portion of the housing,
  - (m) each of said tie bars being relatively narrow in width,
  - (n) said bracing means effecting uniform disbursements of the cuttings over a wide area,
  - (o) power means for driving each of said cutting means,
  - (p) said power means including a single motor,
  - (q) a first flexible drive means connecting said motor means in driving relationship with the cutting means of said main housing,
  - (r) and a second flexible drive means for connecting the motor in driving relationship to the cutting means of each of said auxiliary housings and with the cutter means of said main housing,
  - (s) a clutch means for engaging and disengaging said motor in driving relationship with each of said cutting means,
  - (t) said clutch means including an idler pulley mounted on said housing for movement between operative and inoperative relationship with respect to said flexible drive means,
  - (u) and means for effecting movement of said idler pulley for tensioning or relaxing said flexible drive means accordingly,
  - (v) means for containing a supply of fuel for said motor,
  - (w) said fuel supply means including a receptacle fixedly mounted on said main housing,
  - (x) and a tank adapted to be removably supported in said receptacle for supplying fuel thereto,
  - (y) means for individually locking each of said outboard housings with respect to said main housing,
  - (z) said locking means including an angled lever pivotally mounted on said main housing adjacent the spacing defined between the respective hinged housings,
  - (a1) said lever having a wedge extending outwardly therefrom, said wedge being arranged to be cammed between said main housing and adjacent outboard housing to render said housings immobile with respect to one another when said lever is pivoted into operative locking position.

References Cited
UNITED STATES PATENTS

| | | | |
|---|---|---|---|
| 2,564,586 | 8/1951 | Smith et al. | 56—25.4 |
| 2,865,159 | 12/1958 | Musgrave | 56—25.4 |
| 2,952,961 | 9/1960 | Engler | 56—25.4 |
| 3,012,389 | 12/1961 | Jacobs | 56—6 |
| 3,152,431 | 10/1964 | Ott et al. | 56—25.4 |

FOREIGN PATENTS

| | | |
|---|---|---|
| 156,596 | 5/1954 | Australia. |
| 228,943 | 6/1960 | Australia. |

ABRAHAM G. STONE, *Primary Examiner.*

RUSSELL R. KINSEY, *Assistant Examiner.*